United States Patent [19]

Dunne et al.

[11] Patent Number: 5,425,242
[45] Date of Patent: Jun. 20, 1995

[54] PROCESS FOR RECOVERY AND PURIFICATION OF REFRIGERANTS WITH SOLID SORBENTS

[75] Inventors: Stephen R. Dunne, Bethel, Conn.; Mark T. Staniulis, Peekskill, N.Y.; Alan P. Cohen, New Fairfield, Conn.

[73] Assignee: UOP, Des Plaines, Ill.

[21] Appl. No.: 227,431

[22] Filed: Apr. 14, 1994

[51] Int. Cl.[6] ............................................. F25B 47/00
[52] U.S. Cl. .......................................... 62/85; 62/18; 95/119; 95/142
[58] Field of Search ............... 62/475, 85, 18; 95/115, 95/142

[56] References Cited

U.S. PATENT DOCUMENTS

| | | | |
|---|---|---|---|
| 4,203,734 | 5/1980 | Winter et al. | 95/115 |
| 4,939,903 | 7/1990 | Goddard | 62/77 |
| 5,094,087 | 3/1992 | Gramkow | 62/292 |
| 5,165,247 | 11/1992 | Rockenfeller et al. | 62/72 |
| 5,201,195 | 4/1993 | Gavlak et al. | 62/475 |
| 5,231,980 | 8/1993 | Filipovic et al. | 128/205.12 |
| 5,245,839 | 9/1993 | Chang et al. | 62/292 |

FOREIGN PATENT DOCUMENTS

317709B1  5/1992  Germany ...................... F25B 45/00

*Primary Examiner*—John M. Sollecito
*Attorney, Agent, or Firm*—Thomas K. McBride; John G. Tolomei; Richard P. Silverman

[57] ABSTRACT

A process and apparatus for the recovery and purification of a contaminated refrigerant withdrawn from a refrigeration or refrigerant recovery system which employs a compressor and an adsorbent selective for the adsorption of halogenated hydrocarbons. The adsorbent is selected from the group consisting of silicalite, faujasites, steamed and rare earth exchanged zeolite Y, mordenite, ZSM-5 and mixtures thereof, and more particularly the group consisting of a low cerium rare earth exchanged zeolite Y-84, a low cerium rare earth exchanged zeolite LZ-210, Breck Structure Six, ECR-32, and mixtures thereof. A significant increase in the capacity of these adsorbents over conventional adsorbents combined with the use of novel process steps to recover, purify and return a purified refrigerant to the refrigeration system result in significant cost savings at reduced risk of release of halogenated hydrocarbons to the environment.

18 Claims, 8 Drawing Sheets

R-22 ADSORPTION ISOTHERMS @ 25 °C

R-22 ADSORPTION ISOTHERMS @ 35 °C

PROCESS FOR RECOVERY AND PURIFICATION OF REFRIGERANTS WITH SOLID SORBENTS

FIELD OF THE INVENTION

This invention relates to a process and apparatus for the recovery and purification of refrigerant with a solid adsorbent. More particularly, this invention relates to an efficient process and apparatus for recovering and purifying refrigerant discharged from sources such as automobile air conditioners, home refrigerators and commercial refrigeration facilities.

BACKGROUND OF THE INVENTION

Refrigerants are used throughout the world in machines to provide temperature control in the industrial areas of food processing, storage, and distribution in mechanical air conditioning for homes, buildings and automobiles, and in the chemical industry. Since 1860, with the development of the basic concepts of today's refrigeration system, refrigerants for vapor-compression systems were sought which were stable, incombustible, nontoxic and nonirritating chemical fluids which vaporize and condense at pressures and temperatures appropriate for their application. In about 1930, it was discovered that certain halogenated hydrocarbons having chlorine and fluorine atoms could be employed as "safe" refrigerants. These halogenated hydrocarbons include chlorofluorocarbons (CFC's) and hydrochlorofluorocarbons (HCFC's). Recently, it was discovered that some of these "safe" refrigerants are harmful to the environment, and in particular, the release of CFC's to the atmosphere could lead to damaging of the earth's ozone layer. In the atmosphere they can migrate to the stratosphere where photolysis reactions release the chlorine atoms, which can react with ozone. As a result many Western countries have regulations for the elimination of production of CFC's by Jan. 1, 1996. HCFC's have a hydrogen atom in the molecule which can reduce the stability of the compound relative to CFC's. HCFC's are now considered part of the ozone depletion problem and their production is to be phased out (eliminated) by the year 2030. Hydrofluorocarbons (HFC's) are the replacements for CFC's and HCFC's. Examples of CFC's, HCFC's, and HFC's are given in Table 2 of the 1993 *ASHRAE FUNDAMENTALS HANDBOOK*, American Society of Heating, Refrigerating and Air-Conditioning Engineers, Inc., Atlanta, Ga. page 16.4, which is herein incorporated by reference. Because CFC's and HCFC's may be found in the refrigeration systems of old refrigerators, automobiles, and commercial refrigeration facilities, it is desired to have a "safe", simple and economical way of recovering and/or purifying these compounds with a minimum risk of their release to the environment.

Typically, during the continued operation of a refrigeration system, the refrigerant becomes contaminated with impurities such as water vapor, air, acids and particulate matter. In the past, when a refrigeration system needed repair, the standard practice was to vent or bleed the refrigerant to the atmosphere. This technique wasted refrigerant, which can be cleaned and reused, and added a material to the atmosphere, which is now known to cause damage to the ozone layer.

Various methods have been employed to recover and purify refrigerant from refrigeration units. Some of these methods remove the contaminated refrigerant from the refrigeration units, expand the contaminated refrigerant and remove the impurities by condensation. U.S. Pat. No. 4,939,903 to Goddard is an example of this impurity condensation approach. In these systems, it is critical to maintain the system under pressure at all times to prevent any leakage of the refrigerant to the atmosphere.

Others have developed devices for receiving and dispensing a gaseous refrigerant. For example, U.S. Pat. No. 5,165,247 discloses such a device comprising a pressurized vessel, containing an adsorbent, wherein the adsorbent is secured to a heat exchange surface. The pressurized vessel is connected to refrigeration systems to collect or refill the refrigeration system using either cooling to adsorb refrigerant during a collection operation, or heating to desorb refrigerant during a refill operation.

The U.S. Pat. No. 5,094,087 discloses an apparatus incorporating a purifying filter for reclaiming and recovering volatile liquids such as a refrigerant contained in a closed network. The purifying filter includes an oil mist filter and a moisture adsorbing filter, and the filters are arranged in a flow connection between a discharge side of the compressor and the condenser in a refrigeration system. The filters are periodically removed from the closed network by switch valve means for air drying.

European Patent No. EP0317709B1 discloses a process for disposing of refrigerant from sealed refrigeration systems by opening the system allowing the refrigerant to depressurize and flow to a collecting vessel containing an activated carbon adsorbent. The activated carbon adsorbent adsorbs the refrigerant and permits any air in the system to pass through the collecting vessel, or a group of such vessels connected in series to one another.

In another similar device, U.S. Pat. No. 5,245,839 discloses an apparatus which employs an adsorbent to adsorb refrigerant in a vessel. The adsorbed refrigerant is desorbed with heat to provide a refrigerant gas which is subsequently condensed to a liquid, dried to remove water from the liquid and purged to remove non-condensable gas before returning the refrigerant liquid to a refrigerant reservoir.

U.S. Pat. No. 5,231,980 to Filipovic et at. discloses a process for the recovery of halogenated hydrocarbons from a gas stream, such as anaesthesia in patient exhalent, by passing the gas through a hydrophobic high silica zeolite molecular sieve having a silica to alumina ratio ($SiO_2/Al_2O_3$) of about 12 or greater. The process passes the gas stream through the adsorbent material until just prior to breakthrough. The adsorbed halogenated hydrocarbons are removed from the adsorbent by purging the adsorbent with an inert gas stream at desorption conditions. The halogenated hydrocarbons are subsequently removed from the purging gas stream by condensation, and the condensate is purified by fractional distillation for reuse. The preferred high silica zeolite adsorbent is silicalite.

All of these devices employ separate purification steps requiring additional equipment and liquid or gas handling steps which complicate the process of recovering and purification of refrigerants and increase the risk of escape of refrigerant to the atmosphere. Processes are sought which combine the steps of collecting and purification without requiring additional separation, filtering and purging steps.

Methods are sought which provide for low energy collection and recovery of the refrigerant with a minimum risk of loss of any refrigerant to the environment and with a minimum use of energy in that recovery.

SUMMARY OF THE INVENTION

The present invention may be employed to recover and purify halogenated hydrocarbons. The most common source of these halogenareal hydrocarbons is from vapor-compression refrigeration systems. The present invention may be employed to recover halogenated hydrocarbons from discarded refrigeration systems such as old refrigerators, junked automobile air conditioners and commercial refrigeration systems. The process of the present invention may be used either in a continuous manner whereby refrigerant is both recovered and purified, the process may be terminated following the recovery or adsorption steps in one location and the process continued for the desorption and regeneration steps at another location to provide a recovered and purified refrigerant stream.

The invention can employ an adsorbent material which was found at ambient conditions to have a surprisingly high capacity for adsorbing refrigerants with a correspondingly low selectivity to impurities such as oxygen, nitrogen, carbon monoxide, carbon dioxide, and small quantities of water in the liquid and vapor phase normally present in refrigeration systems.

The present invention is a process for the recovery and purification of a contaminated refrigerant stream comprising halogenareal hydrocarbons and impurities. The impurities include water and air. The process comprises a series of sequential steps. The contaminated refrigerant stream is passed through a first bed of a molecular sieve adsorbent. The adsorbent is selective for the adsorption of halogenated hydrocarbons, whereby the halogenated hydrocarbons are selectively removed from the contaminated refrigerant stream forming a halogenated hydrocarbon front in the first bed. A first vent gas stream comprising the impurities is withdrawn from the first bed. The first vent gas stream is passed to a second bed of the molecular sieve adsorbent. The passing of the contaminated refrigerant stream to the first bed is continued until at least a portion of the halogenareal hydrocarbon front has moved into the second bed. A second vent gas comprising the impurities is withdrawn from the second bed. The passing of the contaminated refrigerant stream is terminated and the first bed is isolated. The first bed is heated to desorb refrigerant from the first bed. A purified refrigerant stream is recovered and a regenerated first bed is provided.

In another embodiment the present invention relates to the use of an adsorbent for the recovery and purification of a contaminated refrigerant stream comprising halogenated hydrocarbons from a mixture thereof with water and air. The adsorbent is selected from the group consisting of ZSM-5, low cerium rare earth exchanged zeolite Y, low cerium rare earth exchanged steamed zeolite Y, mordenite, Breck Structure Six, ECR-32, faujasite having a $SiO_2/Al_2O_3$ ratio less than about 20, and mixtures thereof.

In other embodiments the invention relates to a process for the purification and recovery of a contaminated refrigerant stream comprising halogenated hydrocarbons and impurities including water and air. The contaminated refrigerant stream is passed through a first bed of a molecular sieve adsorbent selective for the adsorption of halogenareal hydrocarbons, whereby the halogenated hydrocarbons are selectively removed from the contaminated refrigerant stream forming a halogenated hydrocarbon front in the first bed. A first vent gas stream comprising the impurities is withdrawn from said first bed. The first vent gas stream is passed to a second bed of the molecular sieve adsorbent. The passing of the contaminated refrigerant stream to the first bed is continued until at least a portion of the halogenated hydrocarbon front has moved to the second bed. A second vent gas comprising the impurities is withdrawn from the second bed. The passing of the contaminated refrigerant stream is terminated and the first bed is isolated. The first bed is sealed and replaced with another bed containing the molecular sieve adsorbent. The contaminated refrigerant stream is passed to the other bed and a third vent gas stream comprising impurities is withdrawn. The third vent gas stream is passed to the other bed until at least a portion of the halogenated hydrocarbon front has moved into the second bed. The steps of sealing and replacing the first bed with the other bed and passing the contaminated refrigerant therethrough until the halogenated hydrocarbon front moves into the second bed are repeated. The passing of the contaminated refrigerant to the other bed is terminated prior to the breakthrough of the halogenated hydrocarbons from the second bed.

DETAILED DESCRIPTION OF THE INVENTION

Figure 1:
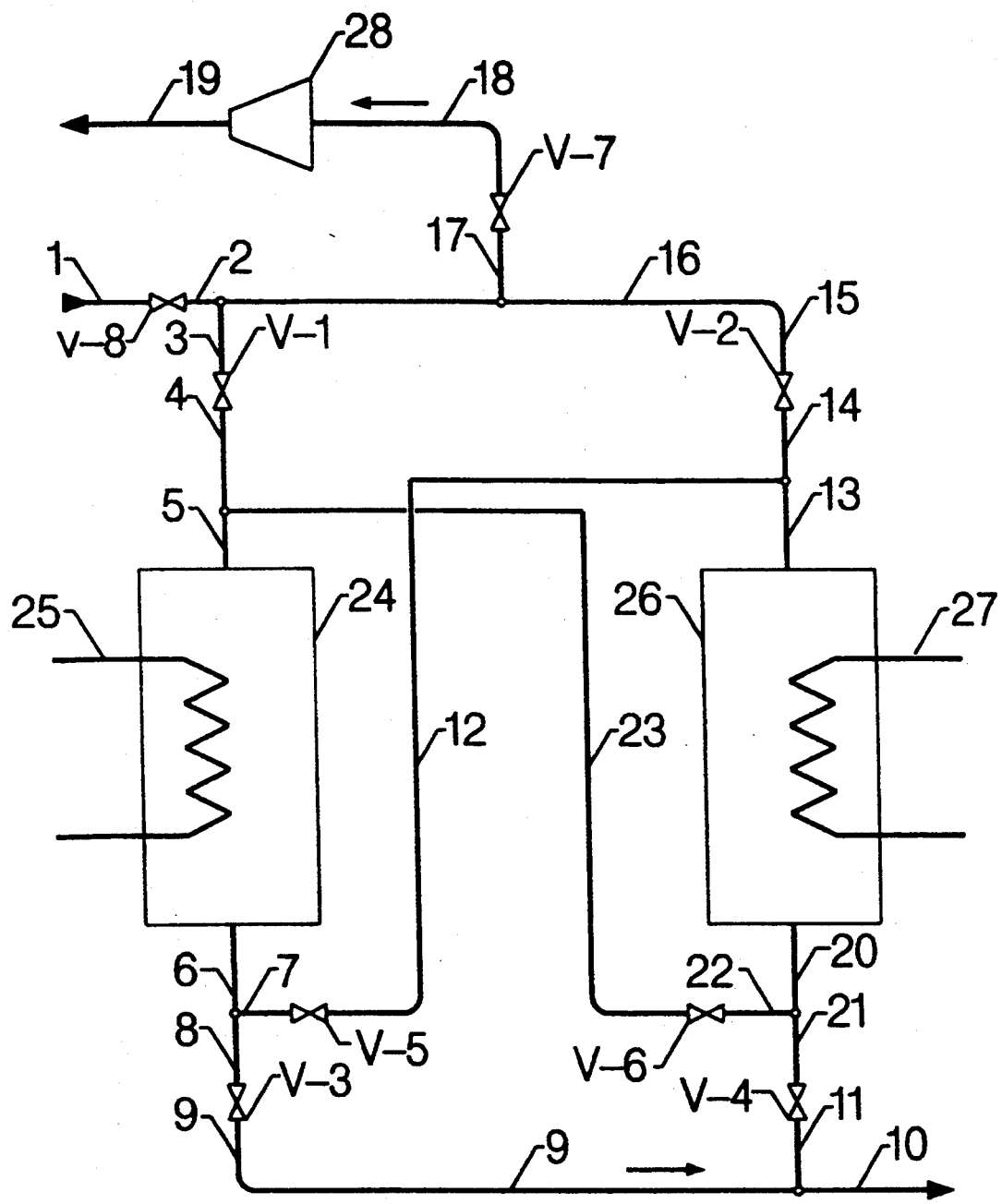
FIG. 1 is a schematic flow diagram of the process of the invention.

The process of the instant invention relates to the recovery of refrigerants from refrigeration systems. The term refrigerants refers to halogenated hydrocarbons including chlorofluorocarbons (CFC's), hydrochlorofluorocarbons (HCFC's), and hydrofluorocarbons (HFC's). More particularly, the invention relates to a method for the recovery, the reclamation and the recycling of refrigerant employing a unique purification step. The term 'recovery' refers to the removal of refrigerant from a refrigeration system into a tank or reservoir with a minimal emission of refrigerant to the atmosphere. The term 'reclamation' refers to the processing of recovered refrigerant usually at a remote site to remove contaminants and returning a purified refrigerant to original refrigerant quality specification. Reclamation is typically accompanied by some chemical or physical analysis to confirm that the quality specifications are achieved. The term 'refrigerant recycling' refers to the processing of recovered refrigerant, usually on the site of the refrigeration system. The refrigerant recycling is typically performed periodically to remove contaminants such as oil, organic and mineral acids, particulates and the like. No analysis procedure is required in refrigerant recycling before returning the purified refrigerant to the refrigeration system. In addition to the above contaminants, impurities such as air, water, and inert gases build up in refrigeration systems as a result of mechanical leaks in the system and leaks which develop during refrigerant transfers to and from the system. These impurities reduce the efficiency of the refrigeration system and must be removed. Typically, the buildup of impurities in refrigerant tanks and systems is removed by releasing a mixture of the refrigerant and the impurities to the atmosphere. The method of this invention, may be employed to remove impurities such as water and air in refrigerant recovery or in refrigerant recycling operations without emitting refrigerant to the atmosphere. The process of the instant invention employs a lead/trim adsorbent bed configuration and an adsorbent cycle of adsorption and desorption steps which minimize the possibility for emission of the refrigerant to the atmosphere. By the use of adsorption zones in a lead/trim configuration, the refrigerant forms a mass transfer zone in the lead adsorbent bed which travels through the adsorption bed, pushing the non-adsorbed impurities out of the lead bed and leaving essentially pure refrigerant adsorbed on the adsorbent. According to the process of the invention, the adsorption of the refrigerant is continued until the mass transfer zone of the refrigerant has passed through the first adsorption zone (lead) and has progressed into a second adsorption zone (trim) such that essentially all of the impurities have been pushed out of the lead adsorption bed, leaving the essentially pure refrigerant remaining in the lead adsorption bed. At this point the adsorbent beds may be isolated. In one embodiment of the invention following the passage of the mass transfer zone of the refrigerant into the trim bed, the lead bed may be sealed at the feed and effluent ends and the lead bed may be transported to a separate site for the recovery of the purified refrigerant. The trim bed may be used with another lead bed to collect additional refrigerant with the termination of the adsorption step in the lead bed following the progression of the new lead bed mass transfer zone into the trim bed. This process of replacing the lead bed with a fresh adsorbent bed may be continued up to the point prior to refrigerant breakthrough from the trim bed.

In another embodiment for a periodic or semi-continuous refrigerant recovery operation, following the passage of the mass transfer zone through a lead bed, the feed end of the second, or trim bed, is connected to the refrigeration system and refrigerant is permitted to flow through the second bed releasing impurities to the atmosphere directly, while the former lead bed or first adsorbent bed is heated to desorb the adsorbed refrigerant and a purified refrigerant stream is recovered. The purified refrigerant can be returned directly to the refrigeration system as a vapor at a point in the refrigeration system such as upstream of the compressor in the refrigeration system; or, the purified refrigerant can be compressed and cooled to form a condensed liquid and reintroduced to the refrigeration system either downstream of the refrigeration system compressor or to a refrigerant storage tank. Preferably, the second adsorbent bed will have sufficient capacity for adsorption of refrigerant to permit the further adsorption of refrigerant in the second adsorbent bed to permit the freshly regenerated first adsorbent bed to be placed in the trim position at a point in the cycle prior to the breakthrough of refrigerant from the second bed, thus completing the cycle. The adsorbent beds can take the form of bottles or cylinders filed with an adsorbent selective for adsorbing refrigerants and having a feed end and an effluent end with a connecting means such as a line or a flexible line and appropriate fittings to connect the feed end of the adsorbent bed to a refrigeration system, and an effluent end which has a connecting means to connect the effluent end of the adsorbent bed to another adsorbent bed. In this configuration, the adsorbent beds can be interchanged between the lead and trim positions depending upon their capacity. In addition, the adsorbent beds will be provided with a heating means such as a steam heater or electric heater in the form of a core or a jacket to provide heat to desorb the adsorbed refrigerant without requiring a purge gas. The introduction of a purge gas during desorption would reintroduce impurities to the purified refrigerant or require further separation steps to remove the purge gas from the refrigerant. Thus the lead bed is heated to desorb the purified refrigerant. The adsorption step for the collection of refrigerant may be carried out at a remote site and then returned to a central location for the desorption or reclamation step, or both the adsorption and desorption steps may be employed at the site of the refrigeration system to provide a recycling system which returns purified refrigerant directly to the refrigeration system.

Although there are a variety of solid adsorbents which are suitable for use according to the present invention including but not limited to activated carbons, activated clays, silica gel, activated alumina and crystalline molecular sieves, molecular sieves are preferred for adsorption because of their uniform pore size, i.e., effective pore diameter. The term "effective pore diameter" is conventional in the art and is used herein to functionally define the pore size in terms of the size of molecules that can enter the pores rather than actual dimensions which are often difficult to determine as the pores are often irregularly shaped, i.e., non-circular. D. W. Breck, in *Zeolite Molecular Sieves*, John Wiley and Sons, New York, 1974, at pages 633 to 641, provides a discussion of effective pore diameter which is hereby incorporated by reference. These molecular sieves include, for example, the various forms of silicoaluminophosphates, and aluminophosphates disclosed in U.S. Pat. Nos. 4,440,871, 4,310,440, and 4,567,027, hereby incorporated by reference, as well as zeolitic molecular sieves.

Zeolitic molecular sieves in the calcined form may be represented by the general formula:

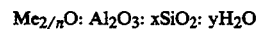

$Me_{2/n}O: Al_2O_3: xSiO_2: yH_2O$ where Me is a cation, n is the valence of the cation, x has a value from about 2 to infinity and y has a value of from about 2 to 10.

Typical well-known zeolites which may be used include, chabazite, also referred to as Zeolite D, clinoptilolite, erionite, faujasite, also referred to as Zeolite X and Zeolite Y, ferrierite, silicalite, mordenite, Zeolite A, and Zeolite P. Derailed descriptions of the above-identified zeolites, as well as others, may be found in D. W. Breck, *Zeolite Molecular Sieves*, John Wiley and Sons, New York, 1974, hereby incorporated by reference. Other zeolites suitable for use according to the present invention are those having a low silica content, i.e. those having silica to alumina ratios less than 50 and preferably less than about 20, more preferably less than about 12, and most preferably a molecular sieve zeolite having silica to alumina ratios of between about 5 and about 12.

Zeolites which are preferred for use in the present invention are those zeolites which permit the desorption of water at moderate to low temperatures and have a relatively low heat capacity. Such preferred zeolites may be selected from the group consisting of faujasite zeolites, and more particularly are selected from the group consisting of zeolite Y-85, low cerium rare earth exchanged zeolite Y-84, Breck Structure Six (BSS), ECR-32, and low cerium rare earth-exchanged LZ-210. Zeolite Y-85 is a steam-stabilized modified zeolite Y the preparation of which is disclosed in U.S. Pat. No. 5,208,197 and is herein incorporated by reference. The low cerium rare earth exchanged zeolite Y-84 is prepared in a manner similar to the preparation of Y-85. The starting material is a form of zeolite Y which has been ion-exchanged with ammonium ions, or ammonium ion precursors such as quaternary ammonium or other nitrogen-containing organic cations, to reduce the alkali metal content to less than about 4.0 wt-% (anhydrous basis) and preferably to less than about 3.0 wt-%. The manner of carrying out this first ammonium ion exchange is not a critical factor and can be accomplished by means well known in the art. A second ammonium ion exchange is carried out in the conventional manner at a pH well above 4.0 and the resulting zeolite is subjected to a rare earth exchange by contacting the zeolite with an aqueous solution of rare earth salt in the known manner. A mixed rare earth chloride salt can be added to an aqueous slurry of the ammonium exchanged zeolite to yield a zeolite product having a rare earth content generally in the range of 3.5 to 12.0 weight percent rare earth as $RE_2O_3$. The product is then water washed and calcined in dry air at a temperature of from about 55° C. to about 850° C., preferably 500° C. to about 750° C. for a period of time to reduce the unit cell dimension to less than 24.8 Angstroms and more particularly in the range of 24.35 to 24.72 Angstroms. The final low cerium rare earth exchanged zeolite Y-84 has a cerium content less than about 0.2 weight percent. Zeolite LZ-210 is defined in a U.S. Pat. No. 4,503,023 in column 12, lines 5–68. The low cerium rare earth exchanged zeolite LZ-210 may be prepared by subjecting the LZ-210 to a conventional rare earth exchange step followed by the dry air calcination step described above, or a steam calcination step wherein steam is introduced during the calcination step according to conventional methods. Preferably the low cerium rare earth exchanged zeolite LZ-210 will be prepared by the process of providing a crystalline sodium zeolite Y starting composition and contacting the starting composition with ammonium cations under cation exchange conditions as exemplified in U.S. Pat. No. 5,013,699 to reduce the $Na_2O$ content of the starting composition to less than 3.0 weight percent to provide an ammonium exchanged composition. Contacting the ammonium exchanged composition with rare earth cations under ion exchange conditions as described hereinabove to provide a rare earth exchanged composition. Hydrothermally steaming the low cerium rare earth exchanged composition at a temperature of from about 550° C. to about 850° C. to reduce the unit cell dimension of the crystal lattice and provide a steam calcined, rare earth exchanged zeolite LZ-210 having a $Si/Al_2$ ratio in the range of 6.5 to 20. It was discovered that adsorbents prepared in the above described manner had surprisingly superior adsorption properties for the adsorption of halogenated hydrocarbons, such as CFC's, HCFC's, HFC's, and water, combined with surprisingly low desorption temperatures for the desorption of these materials. U.S. Pat. Nos. 4,503,023 and 5,013,699 are hereby incorporated by reference.

Other adsorbents in the faujasite family which have a $Si/Al_2$ ratio within a range of about 3 to about 20 and have water and oxygen adsorption values similar to the hereinabove described LZ-210 material are BSS and ECR-32. The structure of BSS, often referred to as 'hexagonal faujasite' is described in Breck, ibid., at pages 55–58, and the direct synthesis of BSS is disclosed in U.S. Pat. No. 5,273,945 as example 1 in Column 7, and is herein incorporated by reference. ECR-32 is a 'cubic variant' of the faujasite structure having a $Si/Al_2$ ratio of at least 6 and containing tetrapropyl and/or tetrabutyl ammonium cations in its super cages as described in European Patent Office publication No. 320114 A on Jun. 14, 1989. The synthesis of ECR-32 is based on the preparation of a gel having the following molar formula:

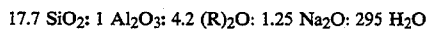

17.7 $SiO_2$: 1 $Al_2O_3$: 4.2 (R)$_2$O: 1.25 $Na_2O$: 295 $H_2O$ wherein R is the tetrapropyl (TPA) and/or tetrabutyl ammonium cation. The gel is prepared by adding a sodium aluminate solution containing sodium hydroxide, sodium aluminate, and aluminum sulfate, to a sodium silicate solution, containing a colloidal silica source(40% silica), TPA(OH), and zeolite-forming aluminosilicate seeds according to the procedure disclosed in U.S. Pat. No. 4,340,573 and EPO publication 320114A, which are hereby incorporated by reference. The gel is maintained at a temperature of about 100° C. for a period of about 10 days to crystallize. The resulting crystals are filtered, washed, and calcined for about 2 hours in air at a temperature of between about 400° C. and about 600° C. Both the BSS and the ECR-32 may undergo the further steps of rare earth exchange and calcination as described hereinabove.

For purposes of the present invention it is required that the solid adsorbent be agglomerated with a binder. Although there are a variety of synthetic and naturally occurring binder materials available such as metal oxides, clays, silicas, aluminas, silica-aluminas, silica-zirconias, silica-thorias, silica-berylias, silica-titanias, silica-alumina- thorias, silica-alumina-zirconias, mixtures of these and the like, clay type binders are preferred. Examples of clays which may be employed to agglomerate the zeolites without substantially altering the adsorptive properties of the zeolite are attapulgite, kaolin, volclay, sepiolite, halloysite, palygorskite, kaolinite, bentonite, montmorillonite, illite and chlorite.

DETAILED DESCRIPTION OF THE DRAWINGS

Figure 2:
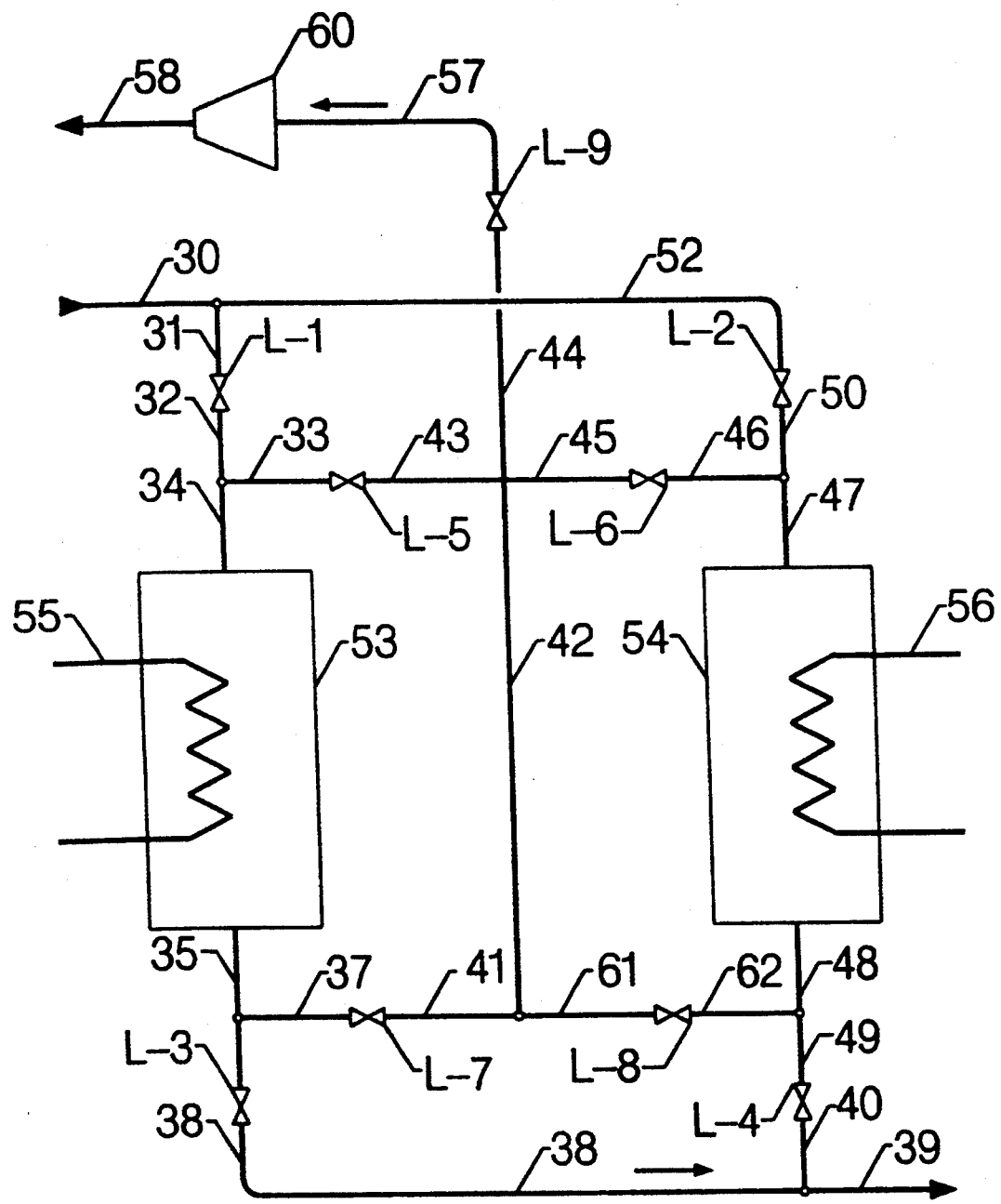
FIG. 2 is a schematic flow diagram of an alternate process of the invention.

The further description of the method of this invention is presented with reference to the attached schematics, FIGS. 1 and FIG. 2. The figures represent preferred arrangements of the invention and are not intended to be a limitation on the generally broad scope of the invention as set forth in the claims. Of necessity, some miscellaneous appurtenances including valves, pumps, separators, heat exchangers, and etc. have been eliminated. Only those vessels and lines necessary for complete and clear understanding of the process of the present invention are illustrated.

Referring to FIG. 1, a schematic diagram of an apparatus for purifying refrigerant according to the process of the instant invention is illustrated. The operation of the process as shown in FIG. 1 is based on an 8-valve design. The apparatus can be employed in a continuous or periodic operation for purifying refrigerant. A contaminated refrigerant gas stream is withdrawn from a refrigeration system and is passed in line 1 through valve V-8, line 2, line 3, valve V-1 and lines 4 and 5 to a first adsorption zone 24. Adsorption zone 24 is filled with an adsorbent selective for the adsorption of the refrigerant. Adsorption zone 24 is operated at ambient conditions such as an adsorption temperature ranging from −15° C. to about 40° C. and about atmospheric pressure and contains a heat exchange coil 25 for use during desorption at a desorption temperature ranging from 30° C. to about 250° C. The contaminated refrigerant enters the adsorption zone 24 and forms a mass transfer zone which travels through the first adsorption zone in the direction of the feed flow. An adsorption effluent is withdrawn from adsorption zone 24 in line 6 and passed via line 7, valve V-5, line 12 and line 13 to a second adsorption zone 26, connected in series with the first adsorption zone. A second adsorption effluent comprising impurities is withdrawn from the second adsorption zone 26 in line 20 and passed through lines 21, valve V-4, line 11 and line 10. In this manner, impurities such as water, air and other gases are vented from the process. The process continues in this adsorption mode until the mass transfer zone of the refrigerant has traveled through adsorption zone 24 and has progressed into adsorption zone 26. At this point in the process, essentially no impurities or contaminants remain in adsorption zone 24. The flow of the contaminated refrigerant through valve V-8 is terminated and the regeneration of adsorption zone 24 with the recovery of purified refrigerant therefrom is begun while adsorption zone 26 is isolated. Valve V-8 is closed and valves V4 and V-5 are closed, and valve V-7 is opened. Heat from an external source, such as hot water, steam or electric power is applied to the heat exchange coil 25 to heat adsorption zone 24 to the desorption temperature. Heating adsorption zone 24 results in the desorption of the previously adsorbed refrigerant from the selective adsorbent, and the desorbed refrigerant evolved therefrom passes through lines 5 and 4, valve V-1, line 3, line 29, line 17, valve V-7, line 18, vacuum pump 28 and line 19. From line 19 the purified refrigerant having had the impurities removed may now be returned to the refrigeration device from which the contaminated refrigerant was removed. Vacuum pump 28 shown in FIG. 1 may be an external vacuum pump for returning the purified refrigerant to the refrigeration system, or may be the compressor within the refrigeration system. In some installations additional filtration equipment (not shown) may be employed to filter mineral and organic acids and sludge from the refrigerant stream at a point before the purified refrigerant is returned to the refrigeration system, or before the contaminated refrigerant enters the first adsorption zone. At the completion of this desorption step, the second adsorption zone 26 may now be activated as the lead bed by closing valve V-7, valve V-5, valve V-4 and valve V-1. Both heater 25 and heater 27 are off. Contaminated refrigerant flows from line 1 through valve V-8, lines 2, 29, 16, and 15, valve V-2, lines 14 and 13 to adsorbent bed 26. An intermediate effluent stream is withdrawn from the adsorption zone 26 via line 20 and passed through line 22, valve V-6, line 23 and line 5 to the fully regenerated bed 24, now in the trim position. The impurities are withdrawn at essentially atmospheric pressure from adsorption zone 24 through lines 6, 8, valve V-3, line 9 and line 10. This lead/trim operation continues until the mass transfer zone of the refrigerant moves from adsorption zone 26 into adsorption zone 24. At this point in the process, adsorption zone 24 is placed on standby and adsorption zone 26 under goes regeneration in a manner similar to that described herein above for adsorption zone 24. Valve V-2 and valve V-7 are open while all other valves are closed, and heater 27 is activated to provide heat for the desorption of refrigerant from adsorption zone 26. Desorbed, purified refrigerant passes from adsorption zone 26 through lines 13, 14, valve 2, line 15, line 16, line 17, valve V-7, line 18, vacuum pump 28, and line 19 to be returned to the refrigeration system.

Referring to FIG. 2, an alternate arrangement of the invention is described. The description hereinbefore presented with reference to FIG. 1 is applicable here unless otherwise set forth below. In the arrangement of FIG. 2, there are 9 valves labeled L-1 through L-9. As in FIG. 1, there are two adsorption beds (bed 53 and bed 54) and two heater means (55 with respect to adsorption zone 53 and heater means 56 with respect to adsorption zone 54). The heater means may employ heated water, steam, or electricity in the form of coils or elements placed in contact with the adsorbent in the adsorption zones. In the operation of the scheme depicted in FIG. 2, initially valve L-1, L-4, L-6, and L-7 are open while all other valves are closed, and the heaters 55 and 56 are in the off position. Contaminant refrigerant enters the process via line 30, line 31, valve L-1, lines 32 and 34 and flows to adsorption zone 53. An intermediate effluent 35 is withdrawn from adsorption zone 53 and passed via line 35, line 37, Valve L-7, lines 41, 42, and 45, Valve L-6, line 46 and line 47 to the feed end of adsorption zone 54. Impurities materials and contaminants are withdrawn as an effluent from adsorption zone 54 in lines 48 and 49, and passed through valve L-4 to lines 40 and 39 where they are vented to the atmosphere. This lead/trim adsorption operation continues until the mass transfer zone of refrigerant passes through adsorption bed 53 into adsorption bed 54 to a point such that only purified refrigerant remains adsorbed on the selective adsorbent within the lead adsorption zone 53. At this point, the valves L-5 and L-9 are open and all other valves are closed and heater 55 raises adsorption zone 53 to the desorption temperature while adsorption zone 54 is isolated. Purified regenerant gas evolves from the desorption of the regenerant in adsorption zone 53 at a desorption pressure at or below atmospheric pressure as heat is applied from heater means 55, allowing purified refrigerant gas to pass through lines 34, 33, valve L-5, line 43, line 44, valve L-9, line 57 to vacuum pump 60 and line 58 to be returned to the refrigeration system. This regeneration of adsorption zone 53 continues until no more refrigerant is evolved. Vacuum pump 60 can again be a separate compression device or it can, optionally, be a compression device within the refrigeration system itself. At the completion of the regeneration of adsorption zone 53, adsorption zone 54 now becomes the lead adsorption zone and regenerated adsorption zone 53 becomes the trim adsorption zone. Valves L-1, L4, L-6, L-7 and L-9 are now closed and valves L-2, L-3, L-5 and L-8 are open while both the heater means 55 and 56 are not operated. Contaminated refrigerant flows from line 30 to lines 52, valve L-2, line 50, and line 47 to adsorption zone 54. An intermediate stream is withdrawn from adsorption zone 54 in line 48 and passed via lines 62, valve L-8, line 61, line 42, line 43, valve L-5, line 33 and line 34 to adsorption zone 53. The impurities in a second effluent stream are withdrawn via line 35 and passed through line 36, valve L-3, line 38 and line 39 to be vented to the atmosphere. This arrangement continues until the mass transfer zone of the refrigerant from adsorption zone 54 passes into adsorption zone 53. At that point, the adsorption zone 53 is placed in standby and adsorption zone 54 undergoes regeneration by the closing of valves L-1 through L-5 and L-7 and L-8, opening valves L-6 and L-9, and activating the heater means 56. Purified refrigerant gas is evolved in adsorption zone 54, passed through line 47, line 46, valve L-6, line 45, line 44 valve L-9, line 57 to vacuum pump 60 and returned to the refrigeration system via line 58.

The invention as depicted in FIG. 1 or FIG. 2 may be employed to purge non-condensable gases such as air from refrigerant recovery and recycle machines. Such machines typically contain filter driers, oil separators, and have a refrigerant recovery tank containing contaminated refrigerant recovered from other refrigeration systems. These systems also contain a refrigerant storage tank containing purified refrigerant. The process of the instant invention may be used to withdraw contaminated refrigerant from the refrigerant recovery tank and return at least a portion of purified refrigerant, depleted in air and water vapor to the refrigerant recovery tank. In another embodiment, a portion of the purified refrigerant from the instant process may be passed to the refrigerant storage tank.

The invention will be further clarified by a consideration of the following examples, which are intended to be purely exemplary of the use of the invention.

EXAMPLES

Example I

Figure 3:
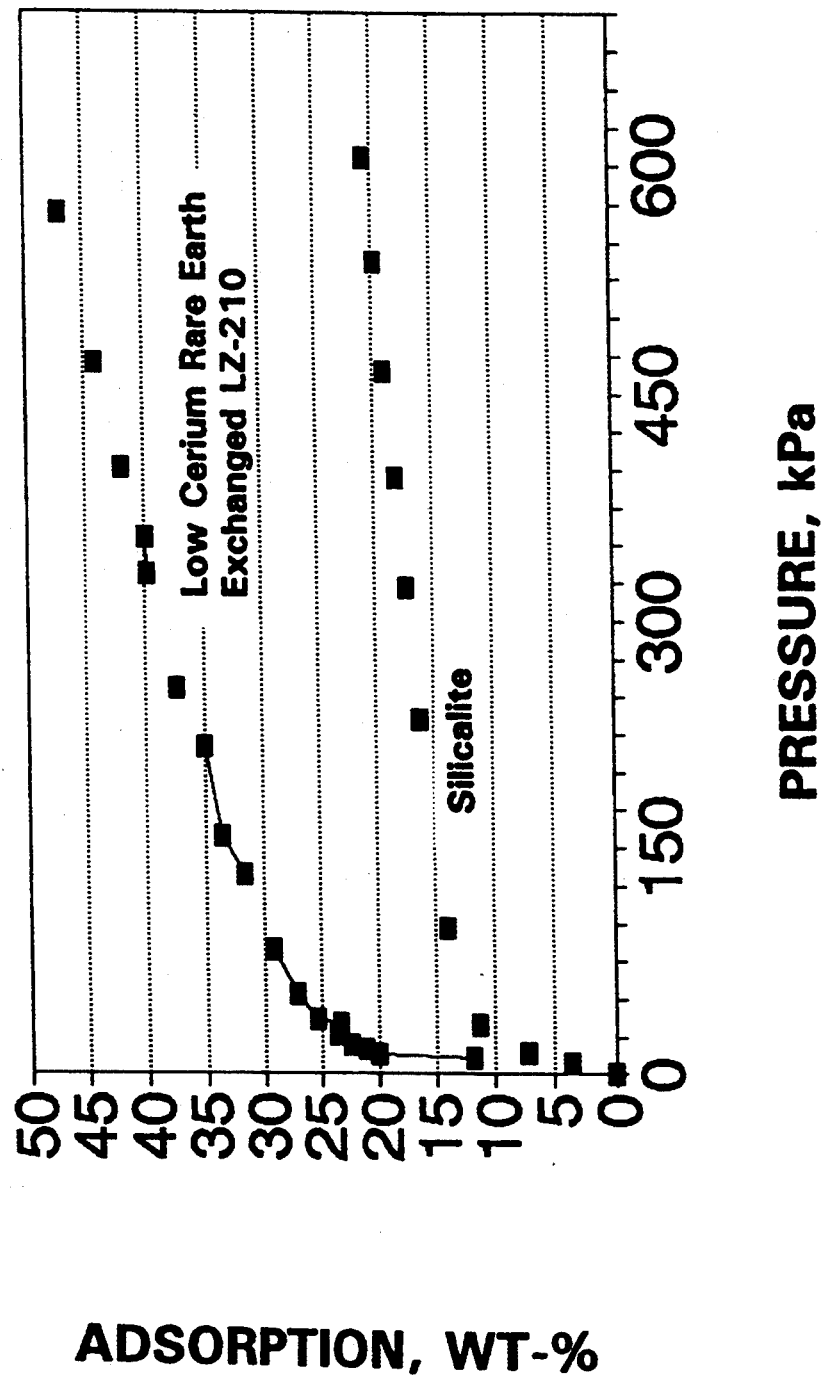
FIG. 3 is a graph showing a refrigerant adsorption isotherm for a low cerium-rare earth exchanged zeolite Y-84 adsorbent.
Figure 4:
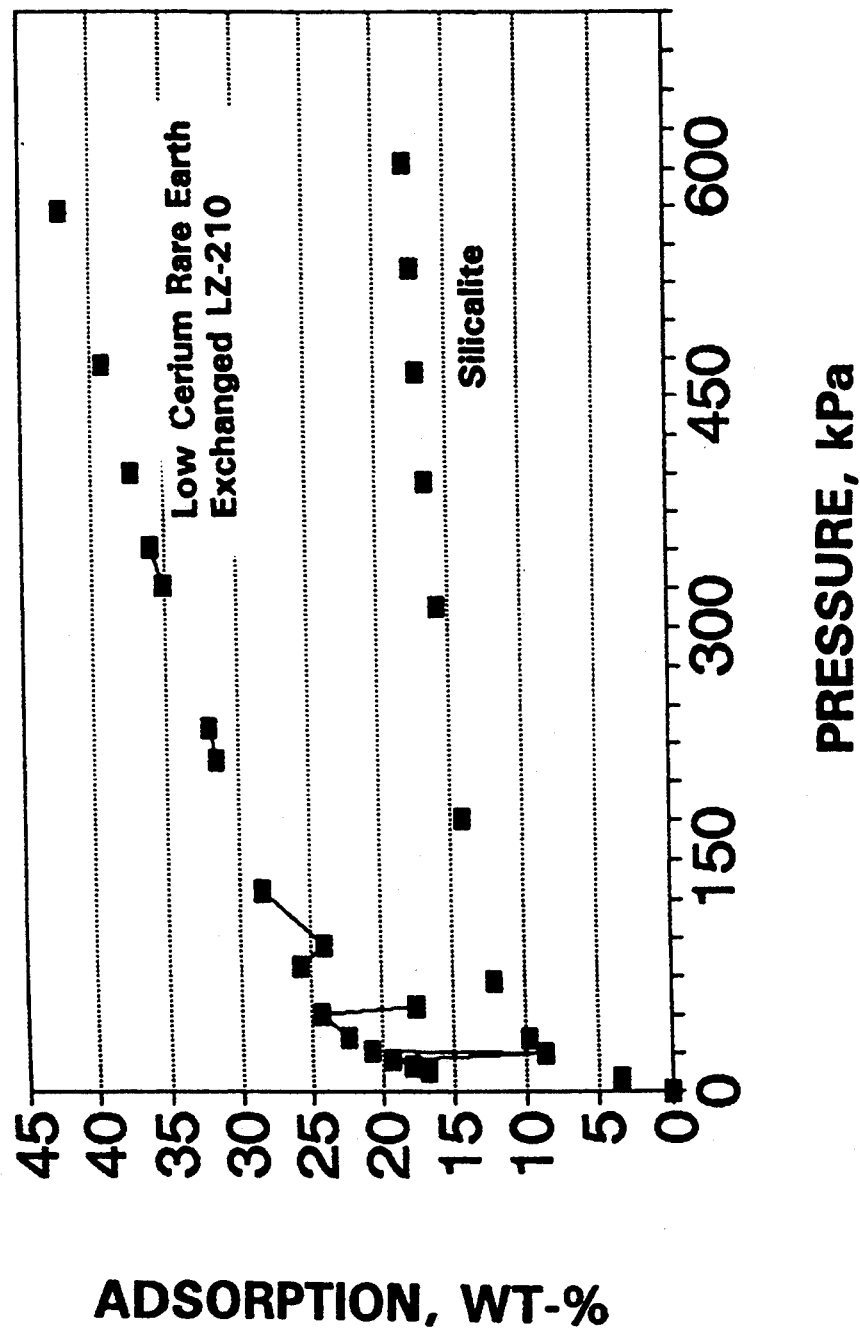
FIG. 4 is a graph showing a refrigerant adsorption isotherm for a low cerium rare earth-exchanged zeolite LZ-210.

The refrigerant adsorption screening tests were conducted in a modified BET absorption apparatus. The apparatus measures adsorption by sensing changes in pressure and temperature inside a reference volume which is attached to an adsorption vessel containing the adsorbent sample. The adsorbent sample was maintained at a steady temperature by the action of a temperature controlled bath. The reference volume can be isolated from the adsorbent vessel by means of an isolation valve. The reference volume may also be connected or isolated from a vapor source by means of another isolation valve, and finally the absolute pressure of the reference volume may be controlled by means of a high vacuum pump which is also connected to the reference volume by means of a third isolation valve. Adsorption measurements were made by first evacuating the reference volume and the adsorbent sample vessel to a pressure of approximately $5 \times 10^{-6}$ torr while heating the adsorbent and adsorbent vessel to an activation temperature of approximately 200° C. The temperature of activation was controlled and monitored. The activation was considered complete after the pressure of the system was dropped to $5 \times 10^{-6}$ torr. (generally, about 16 hours). After activation, the sample was isolated from the reference volume and the evacuation pump and was cooled to room temperature. The reference volume also evacuated to $5 \times 10^{-6}$ torr was also isolated from the vacuum pump and was charged to a vapor pressure of about 5 torr with pure refrigerant vapor. The pressure of refrigerant was monitored by an MKS Baratron Pressure Transducer. Once stable readings were obtained on both the pressure and temperature within the reference volume, the isolation valve separating the adsorbent sample from the reference volume was opened and the pressure and temperature of the system were monitored until they stabilized, i.e., changing no more than by 1 part in $10^6$ within one minute. Refrigerant isotherms were obtained by repeating the isolation, charging and equilibration of the reference volume with the adsorbent vessel until a pre-determined loading level or pressure level were obtained. Refrigerant loadings on an adsorbent sample of a rare earth exchanged zeolite LZ-210 with a $SiO_2/Al_2O_3$ ratio of less than about 12 and silicalite. The isotherms of the refrigerant for the adsorbent were determined at 25° C. and shown in FIG. 3. Surprisingly, the rare earth exchanged zeolite LZ-210 over the range of 100 to about 600 kPa showed an adsorption of R-22 refrigerant in the range of about 30 to about 48 wt % compared to an adsorption of R-22 refrigerant in the range of about 14 to 20 for a silicalite adsorbent. Thus, the low cerium rare earth exchanged LZ-210 showed a better than 2 fold increase in capacity for the R-22 over the silicalite. FIG. 4 shows the performance of the same adsorbent at a temperature of 35° C. At the higher temperature, over a refrigerant pressure from 100 to 600 kPa, the silicalite adsorption capacity ranged from about 12 wt % to about 18 wt %, and the low cerium rare earth exchanged LZ-210 zeolite adsorption capacity ranged from about 25 to about 42, again representing a two fold increase in capacity over the silicalite.

Example II

Samples of low cerium rare earth exchanged zeolite LZ-210 were prepared at a $SiO_2/Al_2O_3$ ratio of 6.5 and 12.0 and a portion of each of the samples were calcined according to normal practice while the remaining portion was in the presence of steam. Adsorption isotherms according to the procedure outlined in Example I were developed for the adsorption of R-22. This isotherm data for R-22 were summarized as a value of Xm for each of the sample adsorbents.

TABLE 1

| ADSORBENT LOADING FOR R-22 @ ABOUT 298° K. | | |
|---|---|---|
| | ADSORBENT | Xm, wt % |
| A | RE210-6.5C | 41.63 |
| B | RE210-6.5S | 46.33 |
| C | RE210-12.0C | 65.67 |
| D | RE210-12.0S | 48.76 |
| E | Silicalite | 18.77 |

The term Xm is the maximum loading level of the adsorbent according to the Langmuir Isotherm Equation (See Adamson, "Physical Chemistry of Surfaces,"4th Edition, John Wiley & Sons, New York, 1982, at p. 521). Adsorbents A and B have a silica to alumina ratio of 6.5 and adsorbents C and D have a silica to alumina ratio of about 12. Adsorbents A and C were calcined, and adsorbents B and D were in the presence of steam (1 wt %) calcined according to procedures well-known to one skilled in the art. Adsorbent E is a silicalite adsorbent. The Xm results for samples A-D indicates that the R-22 adsorption capacity of these faujasite based samples having $SiO_2/Al_2O_3$ ratios of about 6.5 to about 12 showed a greater than 2 times the adsorption capacity over the silicalite sample.

Example III

Figure 5:
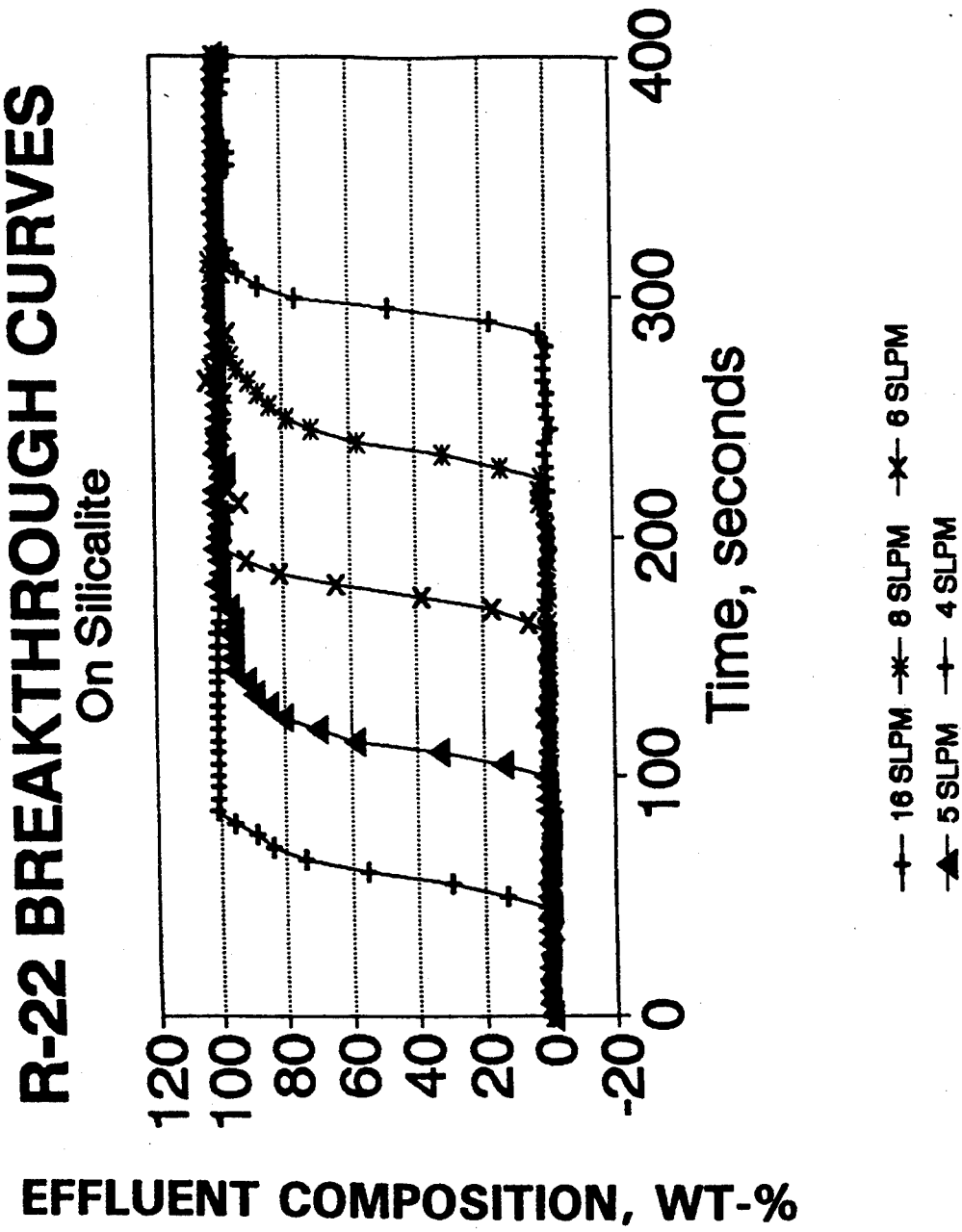
FIG. 5 is a graph showing breakthrough curves for refrigerant R-22 in a bed of silicalite over a range of feed velocities.
Figure 6:
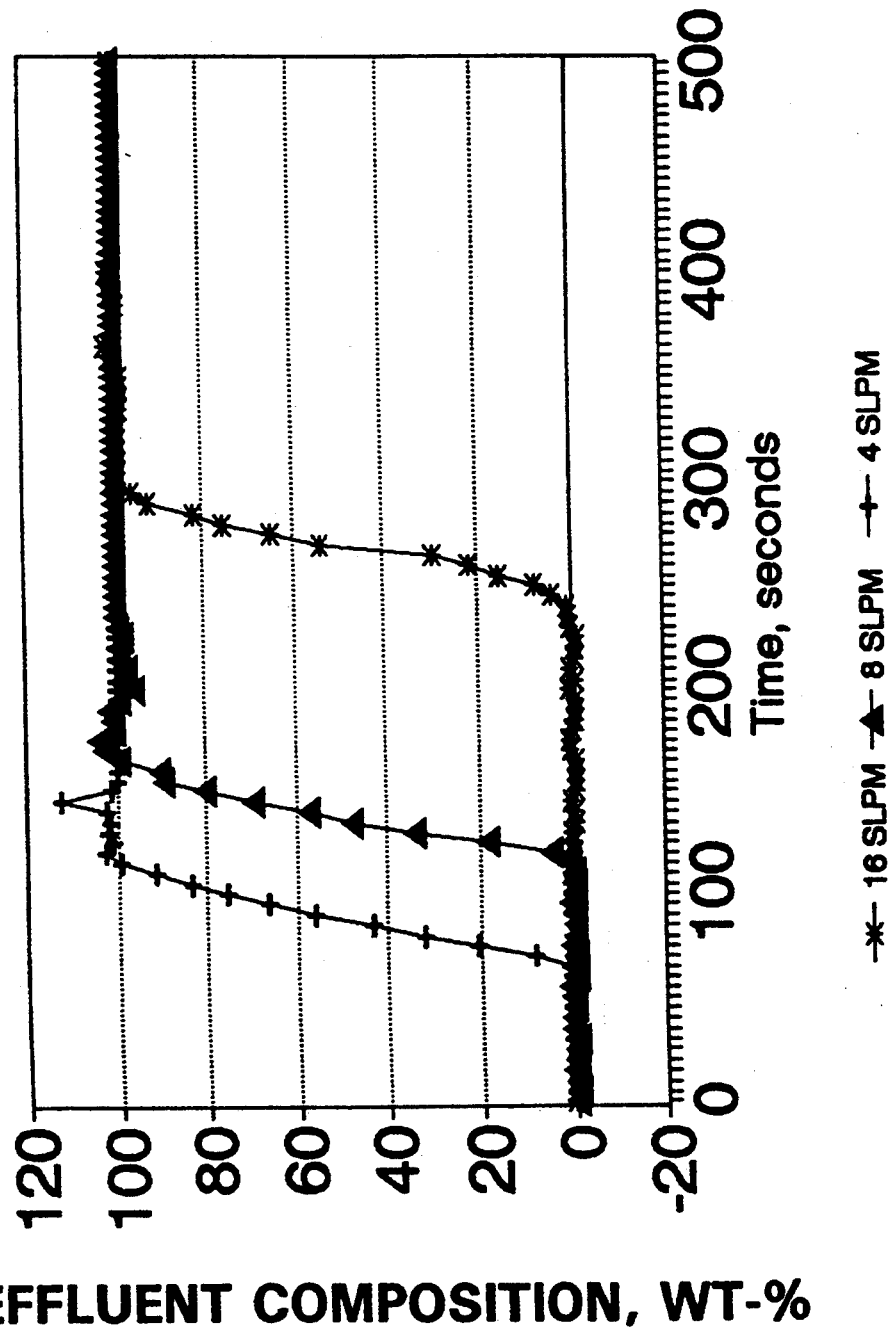
FIG. 6 is a graph showing breakthrough curves for refrigerant R-12 in a bed of silicalite over a range of feed velocities.
Figure 7:
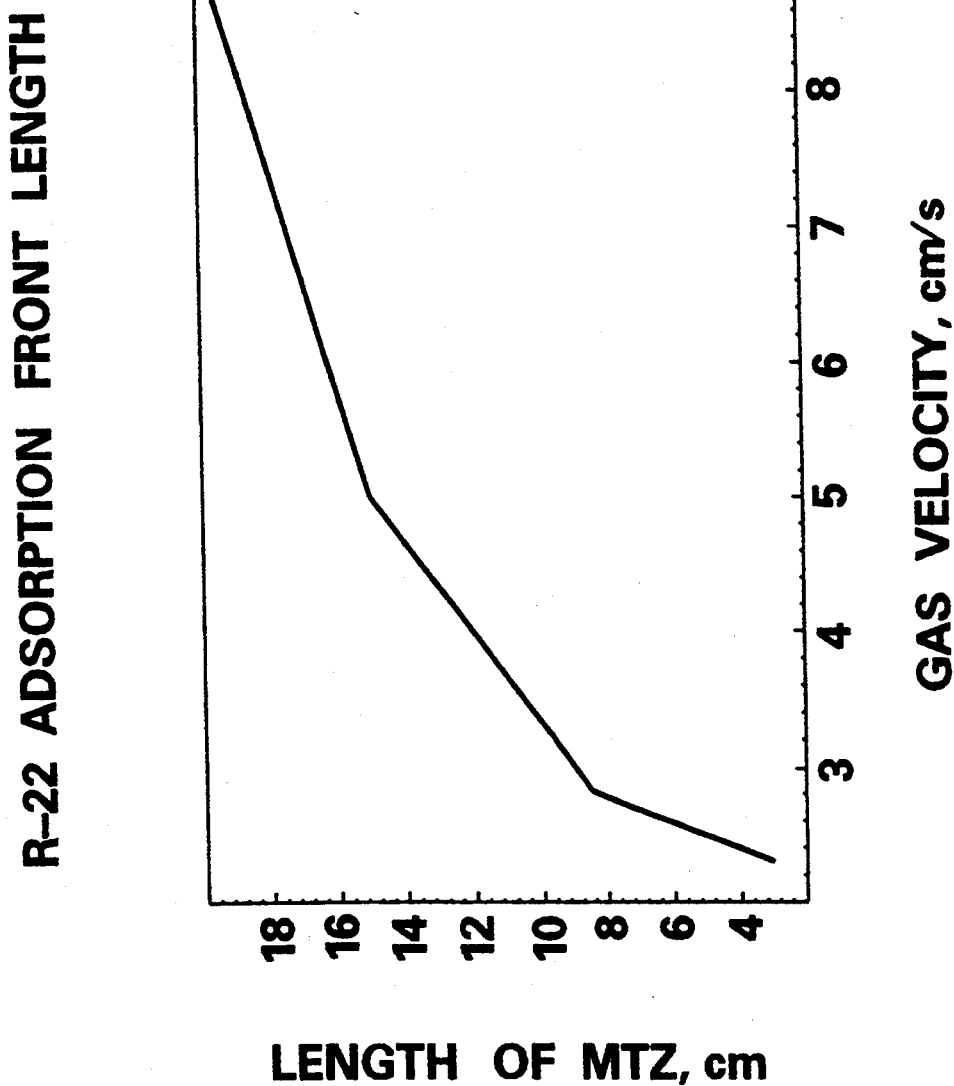
FIG. 7 is a graph showing the length of the R-22 mass transfer adsorption front in a bed containing silicalite over a range of feed velocities.
Figure 8:
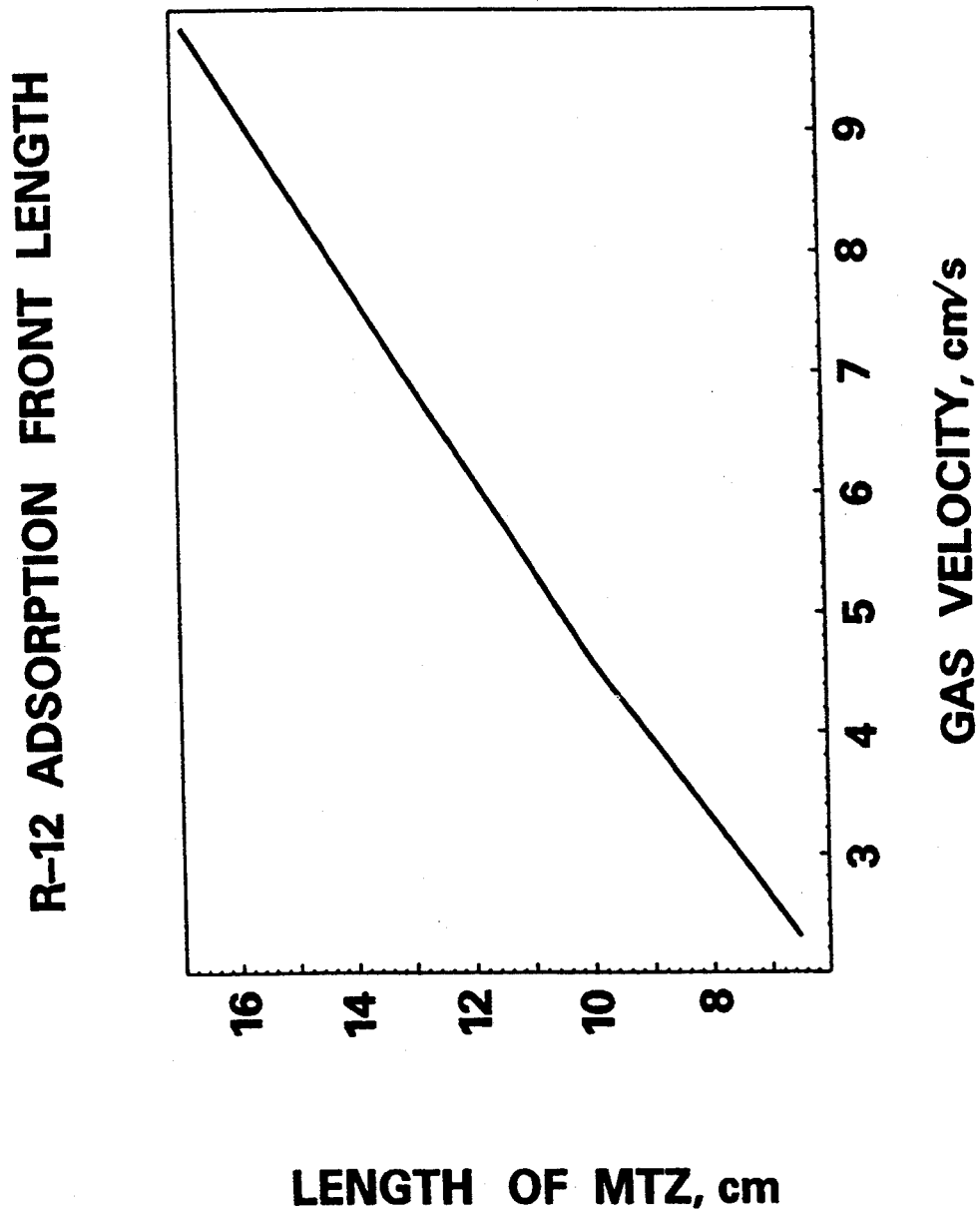
FIG. 8 is a graph showing the length of the R-12 mass transfer adsorption front in a bed containing silicalite over a range of feed velocities.

Experimental measurements of the speed of the mass transfer front and the length of the breakthrough fronts were developed for refrigerant R-22 and R-12 on a silicalite adsorbent. A cylinder with an inside diameter of about 5 cm (2 inches) and 30.48 cm (12 inches) in height was filled with silicalite pellets having a nominal 1.6 mm (1/16 inch) diameter. A refrigerant supply cylinder supplied a flow of refrigerant gas to the cylinder at a flow rate controlled by a pressure regulator and the pressure of the effluent gas from the cylinder was monitored by an absolute pressure transducer. Prior to each experiment, the cylinder, loaded with adsorbent, was purged with nitrogen until no trace of refrigerant vapor was present. The concentration of refrigerant vapor was measured by a flame ionization detector which was calibrated independently for each refrigerant. Following each nitrogen purge, the absolute pressure in the adsorbent filled cylinder was essentially at atmospheric pressure. Refrigerant vapor was introduced at a controlled rate and the pressure and the concentration of refrigerant of the effluent gas was monitored as a function of time. FIG. 5 illustrates the analytical results for the refrigerant R-22 breakthrough curves at flows ranging from 4 to 16 standard liters per minute (SLPM) as measured at 0° C. and 1 atmosphere. FIG. 6 shows the analytical results of the breakthrough curves for refrigerant R-12 at 4, 8, and 16 SLPM. The total pressure of the refrigerant in both determinations was controlled at about 150 kPa (22 psia) and both series were developed at a room temperature of about 25° C. The sharp nature of the mass transfer zone for the refrigerants over the adsorbent indicated that essentially all of the unadsorbed nitrogen, or inert gas, would be pushed out of a first adsorption bed when the mass transfer zone is passed through the first adsorption bed and into a second adsorption bed. The capacity of an adsorption bed at the point when the stoichiometric point of the mass transfer front reaches the end of the bed is by definition the equilibrium capacity of the adsorbent in the adsorption bed. The mass transfer front lengths were determined as a function of the refrigerant gas feed velocity from the breakthrough curves for each refrigerant and shown in FIG. 7 for R-22 and FIG. 8 for R-12. These figures indicate that the front length is a relatively linear function of the gas feed velocity and that for velocities in the range of about 1 to about 10 cm/second, and the results confirm a relatively sharp mass transfer zone wherein following the passing of the mass transfer zone from an adsorbent bed, the material remaining in the adsorbent bed will be essentially all refrigerant. The adsorbents of Example I which demonstrated similarly shaped adsorption isotherms for refrigerants R-22 and R-12 with at least twice the capacity for the adsorption of the refrigerants as silicalite will have a similarly sharp mass transfer zone. The sharp mass transfer profile and relatively short mass transfer length permits a surprisingly large portion of the adsorption bed to be employed for refrigerant capacity with a relatively small portion of the bed reserved for the mass transfer zone. This permits the trim bed to be used with more than one lead bed for refrigerant collection applications.

Example IV

Samples of the BSS and ECR-32 materials were prepared according to the synthesis methods disclosed in U.S. Pat. No. 5,273,945 for BSS and European Patent Office Publication 320114 A for ECR-32, and compared to low cerium rare earth exchanged LZ-210 and Zeolite Y-64, the starting material for producing LZ-210. The results of the analysis are shown in Table 2. The unit cell sizes, Ao are shown for each of the materials tested. The BSS material has a hexagonal structure wherein the a and b dimensions are equal. The silica to alumina ratio of the materials tested ranged from about 5 to about 12. The oxygen adsorption, expressed in weight percent was measured at 100 torr and $-183°$ C. The oxygen adsorption capacities of the BSS and ECR-32 were similar to the Y-64 and the rare earth exchanged and steam calcined LZ-210. The capacity for the adsorption of water was measured at 4.6 torr and about 25° C. The similar silica to alumina ratios and the similar water and oxygen adsorption capacities of the BSS and ECR-32 indicate a similar affinity for the adsorption of refrigerants shown by the low cerium rare earth exchanged LZ-210 zeolites of Example I.

TABLE 2

| COMPARATIVE ADSORBENT PHYSICAL PROPERTIES | | | | |
|---|---|---|---|---|
| | Y-64 | RE LZ-210 | BSS | ECR-32 |
| Ao (a) | 24.711 | 24.58 | 17.36 | 24.506 |
| (c) | | | 28.45 | |
| Si/Al$_2$ | 5.13 | 6.3 | 7.14 | 8.82 |
| O$_2$, wt-% | 35.72 | 34.8 | 32.06 | 36.4 |
| H$_2$O, wt-% | 35 | 28 | 33.7 | 31.4 |

Other embodiments of the invention will be apparent to the skilled in the art from a consideration of this specification or practice of the invention disclosed herein. It is intended that the specification and the examples be considered exemplary only, with the true scope and spirit of the invention being indicated by the following claims.

We claim:

1. A process for the recovery and purification of a contaminated refrigerant stream comprising halogenated hydrocarbons and impurities including water and air said process comprising the following steps:
   a) passing said contaminated refrigerant stream through a first bed of a molecular sieve adsorbent selective for the adsorption of halogenated hydrocarbons, whereby the halogenated hydrocarbons are selectively adsorbed from the contaminated refrigerant stream forming a halogenated hydrocarbon front in said first bed, and withdrawing from said first bed a first vent gas stream comprising said impurities;
   b) passing said first vent gas stream to a second bed of said molecular sieve adsorbent and continuing to pass said contaminated refrigerant stream to said first bed until at least a portion of said halogenated hydrocarbon front has moved into said second bed and withdrawing from said second bed a second vent gas stream at a second vent pressure comprising said impurities;
   c) terminating the passing of said contaminated refrigerant stream to said first bed and isolating said first bed; and d) heating said first bed to desorb refrigerants from said first bed, recovering a purified refrigerant stream and providing a regenerated first bed.

2. The process of claim 1 further comprising:
a) passing said contaminated refrigerant stream to the second bed and withdrawing a third vent gas stream;
b) passing at least a portion of said third vent gas stream to said regenerated first bed and continuing to pass said contaminated refrigerant stream to said second bed until at least a portion of said halogenated hydrocarbon front has moved into said first bed and withdrawing from said first bed a fourth vent gas stream comprising said impurities;
c) terminating the passing of said contaminated refrigerant stream to said second bed and isolating said second bed;
d) heating said second bed to desorb refrigerant from said second bed, recovering a purified refrigerant stream from said second bed and providing a regenerated second bed;
e) repeating step (a) of claim 1 to provide a continuous recovery cycle.

3. The process of claim 1 wherein the molecular sieve adsorbent selective for the adsorption of halogenated hydrocarbons is selected from the group consisting of silicalite, low cerium rare earth exchanged zeolite Y, low cerium rare earth exchanged steamed zeolite Y, mordenite, Breck Structure Six, ECR-32, ZSM-5, and mixtures thereof.

4. The process of claim 1 wherein the molecular sieve adsorbent has a ratio of $SiO_2/Al_2O_3$ of less than about 20.

5. The process of claim 1 wherein the molecular sieve adsorbent has a ratio of $SiO_2/Al_2O_3$ of less than about 12.

6. The process of claim 1 wherein the molecular sieve adsorbent has a ratio of $SiO_2/Al_2O_3$ of between about 5 and about 12.

7. The process of claim 1 wherein the molecular sieve adsorbent is selected from the group consisting of low cerium rare earth-exchanged Y-84, low cerium rare earth exchanged LZ-210, and mixtures thereof.

8. The process of claim 7 wherein the molecular sieve adsorbent has a silica to alumina ratio of between about 5 and about 12.

9. The process of claim 1 wherein the first bed is heated to a temperature in the range of about 30° C. to about 250° C.

10. The process of claim 1 wherein said second vent pressure is at or below atmospheric pressure.

11. The process of claim 9 wherein said first bed is heated by direct heating.

12. The process of claim 1 further comprising withdrawing said contaminated refrigerant stream from a compression refrigeration system having a compressor and returning at least a portion of the purified refrigerant stream to said compression refrigeration system.

13. The process of claim 12 further comprising condensing said purified refrigerant stream prior to returning said portion of the purified refrigerant stream to said compression refrigeration system.

14. The process of claim 13 further comprising drying said purified refrigerant stream prior to returning said purified refrigerant stream to said refrigeration system.

15. The process of claim 12 further comprising passing said purified refrigerant stream to a point in the refrigeration system upstream of said compressor.

16. The process of claim 1 further comprising withdrawing said contaminated refrigerant stream from a refrigerant recovery tank and returning at least a portion of said purified refrigerant stream to said refrigerant recovery tank.

17. The process of claim 16 further comprising passing a portion of said purified refrigerant to a refrigerant storage tank.

18. A process for the recovery and purification of a contaminated refrigerant stream comprising halogenated hydrocarbons and impurities including water and air said process comprising:
a) passing said contaminated refrigerant stream through a first bed of molecular sieve adsorbent selective for the adsorption of halogenated hydrocarbons, whereby the halogenated hydrocarbons are selectively removed from the contaminated refrigerant stream forming a halogenated hydrocarbon front in said first bed, and withdrawing from said first bed a first vent gas stream comprising said impurities;
b) passing said first vent gas stream to a second bed of said molecular sieve adsorbent and continuing to pass said contaminated refrigerant stream to said first bed until at least a portion of said halogenated hydrocarbon front has moved into said second bed and withdrawing from said second bed a second vent gas stream comprising said impurities;
c) terminating the passing of said contaminated refrigerant stream to said first bed and isolating said first bed;
d) sealing said first bed, replacing said first bed with another bed containing said molecule sieve adsorbent, passing the contaminated refrigerant stream to said other bed and withdrawing a third vent gas stream comprising impurities;
e) passing said third vent gas stream to said second bed and continuing to pass said contaminated refrigerant stream to said other bed until at least a portion of said halogenated hydrocarbon front has moved into said second bed; and
f) repeating steps (d) and (e) and terminating said passing of contaminated refrigerant to said other bed prior to breakthrough of said halogenated hydrocarbon front from said second bed.

* * * * *